US006775011B2

(12) United States Patent
Gagliano (10) Patent No.: US 6,775,011 B2
(45) Date of Patent: Aug. 10, 2004

(54) APPARATUS FOR DETERMINING MEASUREMENTS OF AN OBJECT UTILIZING NEGATIVE IMAGING

(75) Inventor: Jeff Gagliano, Pennsbury, PA (US)

(73) Assignee: Accu-Sort Systems, Inc., Hatfield, PA (US)

( * ) Notice: Subject to any disclaimer, the term of this patent is extended or adjusted under 35 U.S.C. 154(b) by 0 days.

(21) Appl. No.: 10/460,821

(22) Filed: Jun. 12, 2003

(65) Prior Publication Data

US 2003/0206305 A1 Nov. 6, 2003

Related U.S. Application Data

(63) Continuation of application No. 09/543,138, filed on Apr. 5, 2000, now Pat. No. 6,603,563.

(51) Int. Cl.$^7$ .......................... G01B 11/30; G01N 21/86
(52) U.S. Cl. .............. 356/601; 250/559.22; 250/559.24
(58) Field of Search ...................... 356/27–28, 601–602, 356/72–73; 250/559.19, 559.29

(56) References Cited

U.S. PATENT DOCUMENTS

| | | | |
|---|---|---|---|
| 3,682,554 A | 8/1972 | Flaczynski | 356/634 |
| 3,819,918 A | 6/1974 | Hale | 235/151.3 |
| 3,897,156 A | 7/1975 | Chasson | 356/638 |

(List continued on next page.)

FOREIGN PATENT DOCUMENTS

| | | | |
|---|---|---|---|
| EP | 0548464 A1 | 6/1993 | |
| EP | 0851206 A1 | 7/1998 | |
| EP | 0903681 A1 | 3/1999 | |
| WO | WO 99/47885 | * | 9/1999 |

*Primary Examiner*—Zandra V. Smith
(74) *Attorney, Agent, or Firm*—Volpe & Koenig, P.C.

(57) ABSTRACT

An apparatus for determining measurements of an object moving along a conveyor path having a support surface is provided. The apparatus includes an object detector located along the conveyor path which is adapted to detect the leading edge of the object and generate a leading edge signal. An object speed detector is located along the conveyor path and is adapted to generate an object speed signal. A light source is located above the conveyor path and generates a light beam having a sharp edge which extends across the support surface in a direction transverse to a direction of movement of the object to define a light beam intersect path on the support surface. The light beam is arranged at a fixed angle of incidence of less than 90° relative to the support surface. An image sensor is located above the support surface and includes a line of sight generally normal to the support surface which is directed through a lens located at a fixed position between the image sensor and the support surface to focus a reflected image of the light beam intersect path projected on the support surface onto the image sensor. The image sensor detects the light beam intersect path on the support surface only in areas not obstructed by the object and generates a negative image profile signal. A signal processor is provided in communication with the object detector, the object speed sensor and the image sensor which receives the leading edge signal, the object speed signal and the negative image profile signal and calculates an approximate object size. The object position and orientation can also be determined.

8 Claims, 4 Drawing Sheets

U.S. PATENT DOCUMENTS

| | | | |
|---|---|---|---|
| 4,063,820 A | 12/1977 | Borgese | 356/167 |
| 4,105,925 A | 8/1978 | Rossol et al. | 250/561 |
| 4,212,534 A | 7/1980 | Bodlaj | 356/1 |
| 4,678,920 A | 7/1987 | Iadipaolo et al. | 250/559.05 |
| 4,803,371 A | 2/1989 | Durland | 250/560 |
| 4,908,574 A | 3/1990 | Rhoades et al. | 324/675 |
| 4,929,843 A | 5/1990 | Chmielewski, Jr. et al. | 250/561 |
| 4,939,378 A | 7/1990 | Joannes et al. | 250/559.08 |
| 5,220,536 A * | 6/1993 | Stringer et al. | 702/156 |
| 5,311,999 A * | 5/1994 | Malow et al. | 209/583 |
| 5,325,178 A * | 6/1994 | Louis et al. | 356/630 |
| 5,373,363 A | 12/1994 | Kobayashi | 356/383 |
| 5,483,051 A | 1/1996 | Marchi | 235/462 |
| 5,636,028 A | 6/1997 | Stringer et al. | 356/383 |
| 5,699,161 A | 12/1997 | Woodworth | 356/379 |
| 5,764,367 A | 6/1998 | Schaede et al. | 356/429 |
| 5,831,737 A | 11/1998 | Stringer et al. | 356/383 |
| 5,864,404 A | 1/1999 | Amorosi | 356/379 |
| 5,923,428 A | 7/1999 | Woodworth | 356/375 |
| 5,969,823 A | 10/1999 | Wurz et al. | 356/386 |
| 5,991,041 A * | 11/1999 | Woodworth | 356/602 |
| 6,603,563 B1 * | 8/2003 | Gagliano | 356/601 |

* cited by examiner

APPARATUS FOR DETERMINING MEASUREMENTS OF AN OBJECT UTILIZING NEGATIVE IMAGING

CROSS REFERENCE TO RELATED APPLICATION

This application is a continuation of U.S. patent application Ser. No. 09/543,138, filed Apr. 5, 2000 now U.S. Pat. No. 6,603,563, which is incorporated by reference as if fully set forth.

BACKGROUND

The present invention relates to an apparatus for determining the dimensions of a package or object moving along a conveyor, and more particularly, to an apparatus for estimating the length, width and height of an object regardless of the objects orientation on the conveyor.

In many industries, it is often necessary to determine the volume of an object or package for a variety of reasons, such as calculating shipping costs, which can be based upon the volume and/or weight of an object. This information can also be used in connection with planning loads for a delivery vehicle based on the available packing volume. It is desirable to be able to make such measurements automatically while the object or package is being transported along a surface, such as a conveyor surface, in order to provide for high throughput of the objects or packages. The need for efficiency in handling packages has become more apparent based on the increase in shipping for e-commerce businesses.

One known system utilizes a laser scanner in connection with a CCD reader in order to determine the volume of an object. However, the system has not proven reliable in use. Additionally, several of the known arrangements may introduce large errors into the calculation of the object dimensions which can result in undercharging or overcharging of shipping fees as well as additional problems in planning loads.

It would be desirable to provide a fast and accurate system for determining the overall dimensions of an object traveling on a conveyor. It would also be desirable to be able to provide information on the object orientation and position on the conveyor. This information can be utilized by label and/or bar code scanners in order to properly direct and focus the scanners and image sensors on the object.

SUMMARY

Briefly stated, the present invention is directed to an apparatus for determining the measurements of an object moving along a conveyor path having a support surface. The apparatus includes an object detector located along the conveyor path which is adapted to detect the leading edge of the object and generate a leading edge signal. An object speed detector is located along the conveyor path and is adapted to generate an object speed signal. A light source is located above the conveyor path and generates a light beam having a sharp edge which extends across the support surface in a direction transverse to a direction of movement of the object to define a light beam intersect path on the support surface. The light beam is arranged at a fixed angle of incidence of less than 90° relative to the support surface. An image sensor is located above the support surface and includes a line of sight generally normal to the support surface which is directed through a lens located between the image sensor and the support surface to focus a reflected image of the light beam intersect path projected on the support surface onto the image sensor such that the image sensor detects the light beam intersect path on the support surface only in areas not obstructed by the object and generates a negative image profile signal. A processor is provided in communication with the object detector, the object speed sensor and the image sensor which receives the leading edge signal, the object speed signal and the negative image profile signal and calculates an approximate object size.

In another aspect, the present invention provides a method of determining measurements of an object moving along a conveyor path having a support surface. The method includes:

(a) projecting a light beam having a sharp edge from a light source aimed at a fixed angle of incidence transversely across the support surface to define a light beam intersect path on the support surface;

(b) moving the object along the support surface;

(c) sensing a leading edge of the object at a fixed point along the conveyor path with a first sensor and generating a leading edge signal;

(d) detecting the speed of the object with an object speed detector and generating an object speed signal;

(e) detecting an initial blockage of the light beam intersect path on the support surface by the object and generating a height timing signal;

(f) observing a reflected image of the light beam intersect path projected on the support surface in areas not obstructed by the object as the object moves along the support surface with an image sensor having a line of sight generally normal to the object support surface and generating a negative image profile signal;

(g) transmitting the leading edge signal, the object speed signal, the height determination signal, and the negative image profile signal to a processor; and (h) calculating the object dimensions in the processor using the signals received from step (g).

BRIEF DESCRIPTION OF THE DRAWING(S)

The foregoing summary, as well as the following detailed description of the preferred embodiments of the invention, will be better understood when read in conjunction with the appended drawings. For the purpose of illustrating the invention, there is shown in the drawings an embodiment which is presently preferred. However, it will be understood by those skilled in the art from the present disclosure that the invention is not limited to the precise arrangement and/or equipment shown. In the drawings.

DETAILED DESCRIPTION OF THE PREFERRED EMBODIMENT

Certain terminology is used in the following description for convenience only and is not limiting. The words "right,"

"left," "lower" and "upper" designate directions in the drawings to which reference is being made. The words "inwardly" and "outwardly" refer to directions toward and away from, respectively, the geometric center of the apparatus 10 for determining measurements of an object 12 in accordance with the present invention, and designated parts thereof. The terminology includes the words specifically noted above as well as derivatives thereof and words of similar import. Additionally, the words "a" and "one" are understood to mean one or more of the designated item unless specifically noted.

Referring now to the drawings where like elements are designated with like element numerals throughout, there is shown in FIGS. 1–6 a preferred embodiment of an apparatus 10 for determining measurements of an object 12 moving along a conveyor path 14 having a support surface 16. While in the preferred embodiment, the support surface 16 is illustrated as being the moving conveyor belt, it will be recognized by those skilled in the art from the present disclosure that the conveyor path 14 could be formed by other structure, such as rollers, moving plates, carts or a fixed surface having pushers for moving objects 12 along the surface, as well as any other type of surface along which objects or packages can be moved. An object detector 20 is located along the conveyor path 14. The object detector 20 is preferably a photo eye which is directed across the conveyor path 14 at an opposing light source or reflector such that when an object 12 moving on the conveyor path 14 passes the object detector 20, the beam is broken indicating the presence of an object 12. The detector 20 is adapted to detect a leading edge of the object 12 and generates a leading edge signal as will be explained in more detail below. In a preferred embodiment, the object detector 20 may also act as a trailing edge sensor since after the object 12 passes beyond the object detector 20, the interruption of the beam is ended allowing the trailing edge position of the object 12 to be determined as outlined below. While in the preferred embodiment of the invention, a photo eye is utilized as the object detector 20, it will be recognized by those skilled in the art from the present disclosure that other types of sensors may be utilized to detect the leading and/or trailing edges of an object 12 traveling along the conveyor path 14, such as an image detector or any other suitable detector arrangement.

Figure 1:
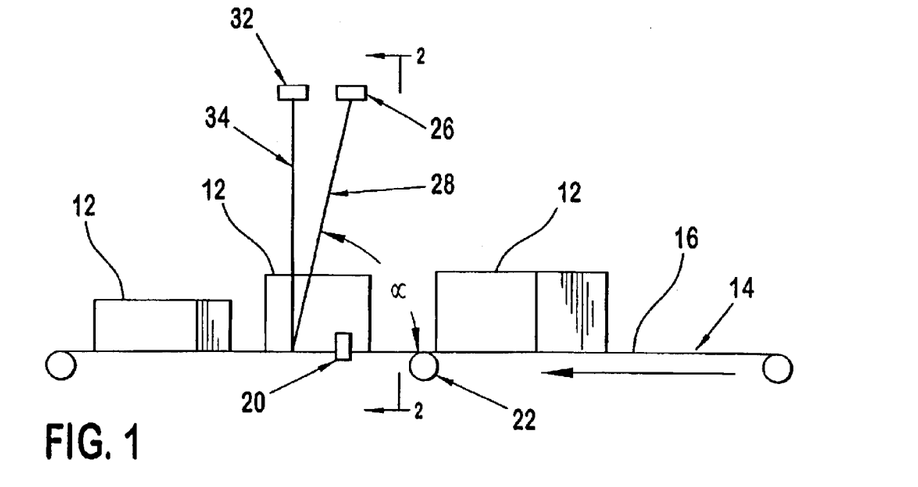
FIG. 1 is a side elevational view of the apparatus for determining measurements of an object moving along a conveyor path in accordance with the present invention.

Still with reference to FIG. 1, an object speed detector 22 is also provided along the conveyor path 14. In a preferred embodiment, the speed detector 22 is a tachometer which senses a speed of the conveyor belt provided as the conveyor path 14 which carries the object since the speed of the belt and the object would be the same. However, it will be recognized by those skilled in the art from the present disclosure that other types of speed detectors can be utilized in order to directly track the speed of the object 12, if desired. For example, a second detector could be positioned along the conveyor path 14 a fixed distance from the object detector 20 with the object speed being calculated based upon the signals received from the two detectors. Those skilled in the art will also recognize that any other suitable means for detection of the objects velocity may also be utilized, if desired.

Figure 2:
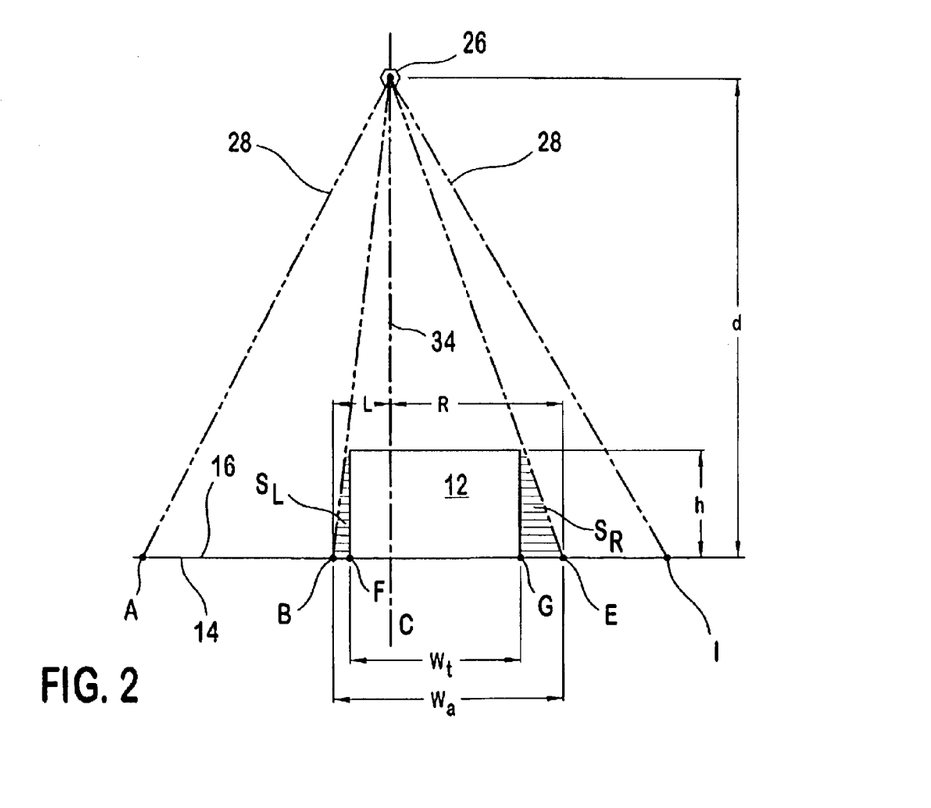
FIG. 2 is a rear elevational view taken along line 2—2 in FIG. 1.

As shown in detail in FIGS. 1 and 2, a light source 26 is located above the conveyor path 14 and is adapted to generate a light beam, represented as line 28, having a sharp or distinct edge which extends across the support surface 16 in a direction transverse to a direction of movement of the object 12 to define a light beam intersect path 30 on the support surface 16. The light beam 28 is positioned at a fixed angle of incidence α of less than 90° relative to the support surface 16. In the preferred embodiment, the light source 26 is a static light source and the light beam 28 is a visible line of light from a laser. However, other types of light sources may be utilized. The only requirement is that the light source 26 project at least one sharp edge. For example, a row of bright LED's may be utilized if they are baffled in such a way to create an illumination area with a single sharp edge. The sharp edge of the light beam 28 is projected transversely across the support surface 16 to form the light beam intersect path 30, as shown most clearly in FIG. 3.

An image sensor or detector 32 is located above the support surface 16. The image sensor 32 has a line of sight which is generally normal to the support surface 16 and preferably includes a lens located between the image sensor 32 and the support surface 16 to focus a reflected image of the light beam intersect path 30 projected on the support surface 16 onto the image sensor 32. The image sensor 32 detects the light beam intersect path 30 on the support surface 16 only in areas not obstructed by the object 12 and generates a negative image profile signal which corresponds to the unobstructed areas of the support surface 16 at a given moment. In a preferred embodiment of the invention, the image sensor 32 is a linear sensor array, and more preferably is a photodiode array. However, it will be recognized by those skilled in the art from the present disclosure that other types of image sensors may be utilized and that the present invention is not limited to a linear sensor.

Figure 6:
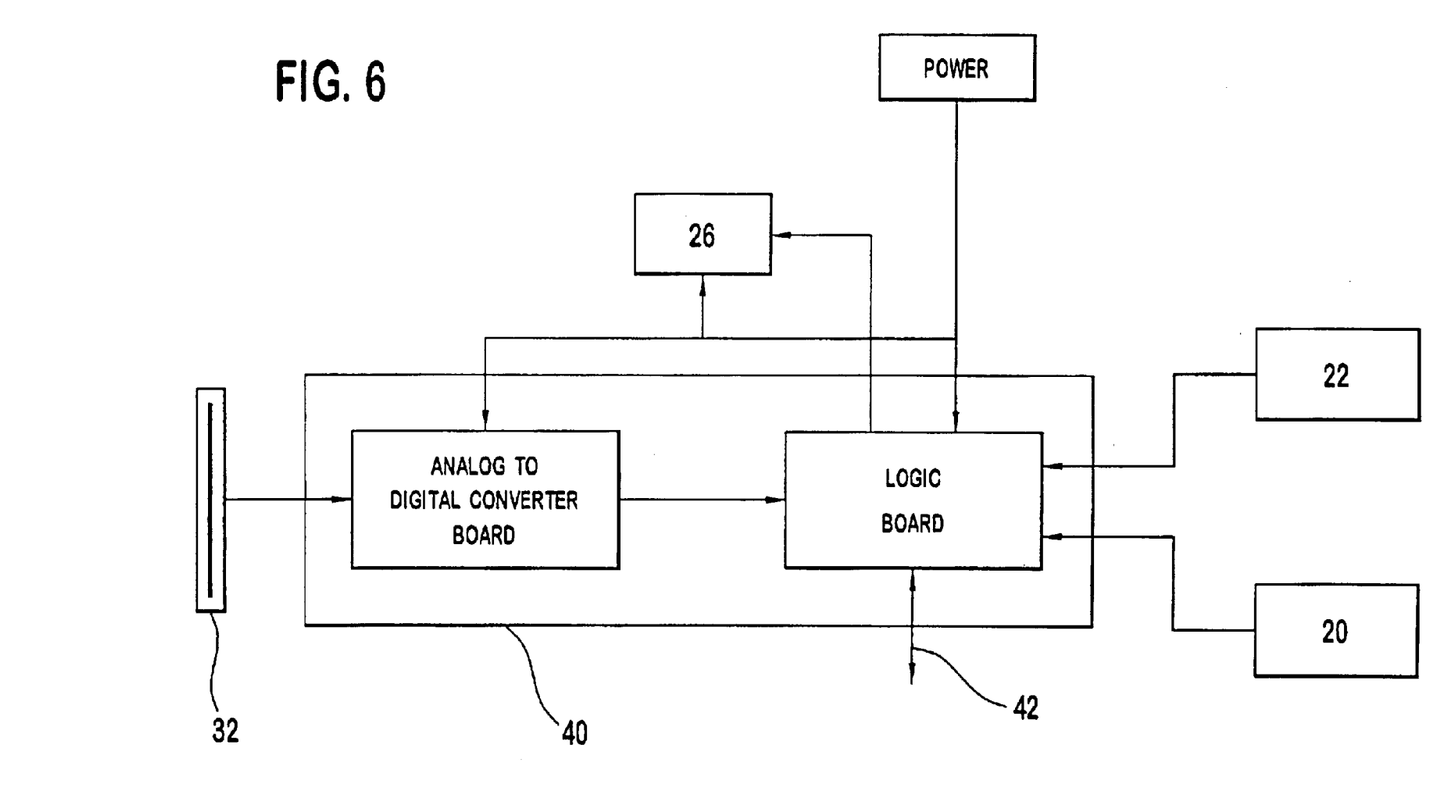
FIG. 6 is a block diagram of the components of the apparatus for determining measurements of an object in accordance with the present invention.

As shown most clearly in FIG. 6, a processor 40 is provided in communication with the object detector 20, the object speed sensor 22 and the image sensor 32. The processor 40 receives the leading edge signal, the object speed signal and the negative image profile signal and calculates an approximate object size as explained in detail below. Preferably, the processor 40 includes an analog to digital convertor to convert the signal from the image sensor 32 which is then transmitted to the logic board along with the leading edge signal and the object speed signal. The logic board include a CPU which is programed to carry out the calculation of the object dimensions as explained in detail below. After the approximate object dimensions have been calculated, these are outputted from the processor 40 via output path 42 and can be used in conjunction with various other systems, such as systems for tracking charges, object size, or controls for scanners located further down the conveyor in order to allow proper focusing and or positioning of the scanners. In the preferred embodiment, the processor 40 also controls the light source 26.

The apparatus 10 in accordance with the preferred embodiment of the present invention can be used to determine measurements of an object 12 moving along a conveyor path 14 having a support surface 16 by projecting the light beam 28 having a sharp edge from the light source 26 which is aimed at a fixed angle of incidence a transversely across the support surface 16. The object 12 is moved along the support surface 16 until it reaches a position where a leading edge of the object 12 is detected or sensed by a first sensor in the form of the object detector 20 which generates a corresponding leading edge signal. The speed of the object 12 is also detected via the objects speed sensor 22, which is preferably the tachometer, which generates an object speed signal. As the object 12 continues to progress along the conveyor path 14, it creates a blockage of the sharp edge of the light beam 28 on the support surface 16, as shown most clearly in FIG. 3. The light beam 28 at the blocked portion falls on the object 12 and, due to the angle of incidence of the light beam 28, is displaced from the intercept point of the light beam 28 and the support surface 16. The displacement is a function of the height of the object 12 at a given point. Upon first detecting a blockage of the sharp edge of the light beam 28 by the object 12, a height timing signal is generated. A reflected image of the sharp edge of the light beam 28 projected on the support surface 16 in areas not obstructed by the object 12 as the object 12 moves along the support surface 16 is observed by the image sensor 32 which includes a line of sight 34 generally normal to the object 12 support surface 16. The image sensor 32 generates a negative image profile signal corresponding to the portions of the light beam intersect path 30 where the support surface 16 is not obstructed by the object 12. This is illustrated most clearly in FIGS. 2 and 3 wherein the segment of the light beam 28 between points A and B and the segment of the light beam 28 between points E and I would be observed by the image sensor 32 and transmitted to the processor 40. This can be used in conjunction with the leading edge signal, the object speed signal and the height determination signal to determine the object dimensions. The object dimensions are then calculated in the processor 40 using these signals as explained in more detail below. A flow diagram showing these steps is provided in FIG. 5.

Since in the preferred embodiment, the image sensor or detector 32 is a photodiode array which scans at a fixed rate of 500 scans per second, it is possible to calculate the conveyor speed in order to determine the number of scans per inch of travel. The conveyor speed may be measured by the object speed detector 22, or may be input as a parameter or simply determined from a known box. Based upon the 500 scans per second in the preferred embodiment, the scans per inch can be calculated as 2500/object velocity in feet per minute.

Another value which must be known is the height of the light source 26 above the support surface 16. This allows the calculation of other important data such as the distance which each pixel of the image sensor 32 represents. In the preferred embodiment, if the image sensor 32 is 100 inches above the belt, the field of view is 52 inches wide which results in approximately 0.1 inches per pixel.

Figure 3:
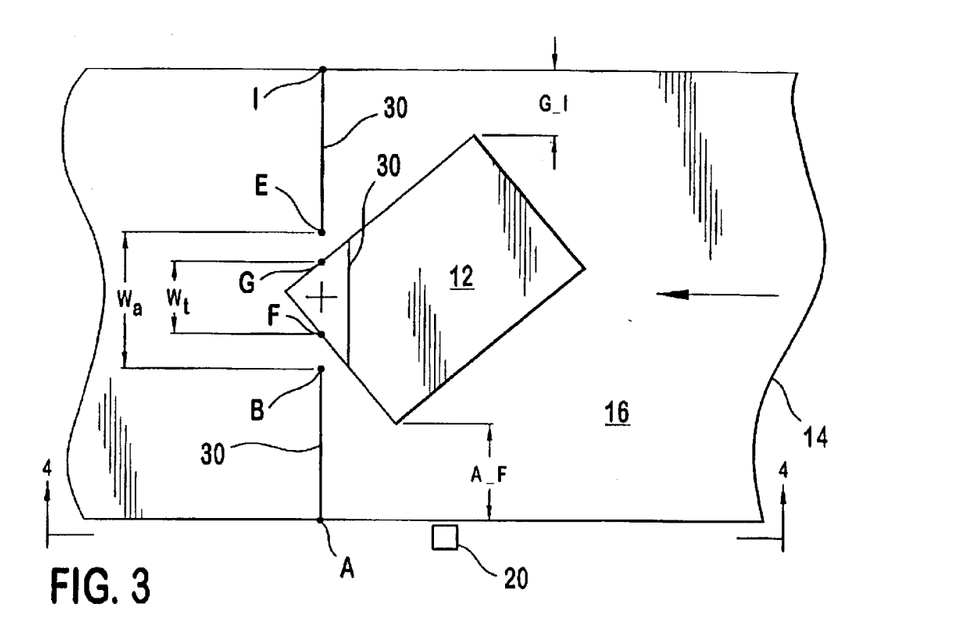
FIG. 3 is a top planned view of an object in the process of being measured using the apparatus in accordance with the present invention.
Figure 4:
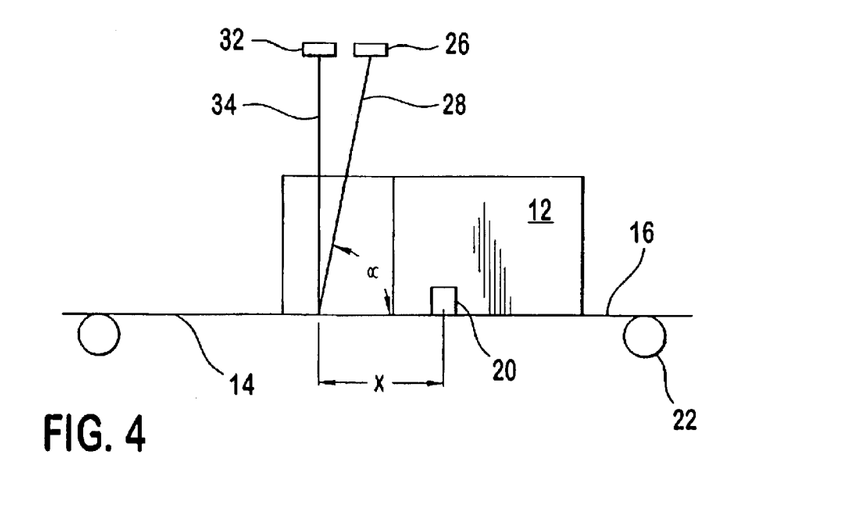
FIG. 4 is a side elevational view taken along line 4—4 in FIG. 3.
Figure 5:
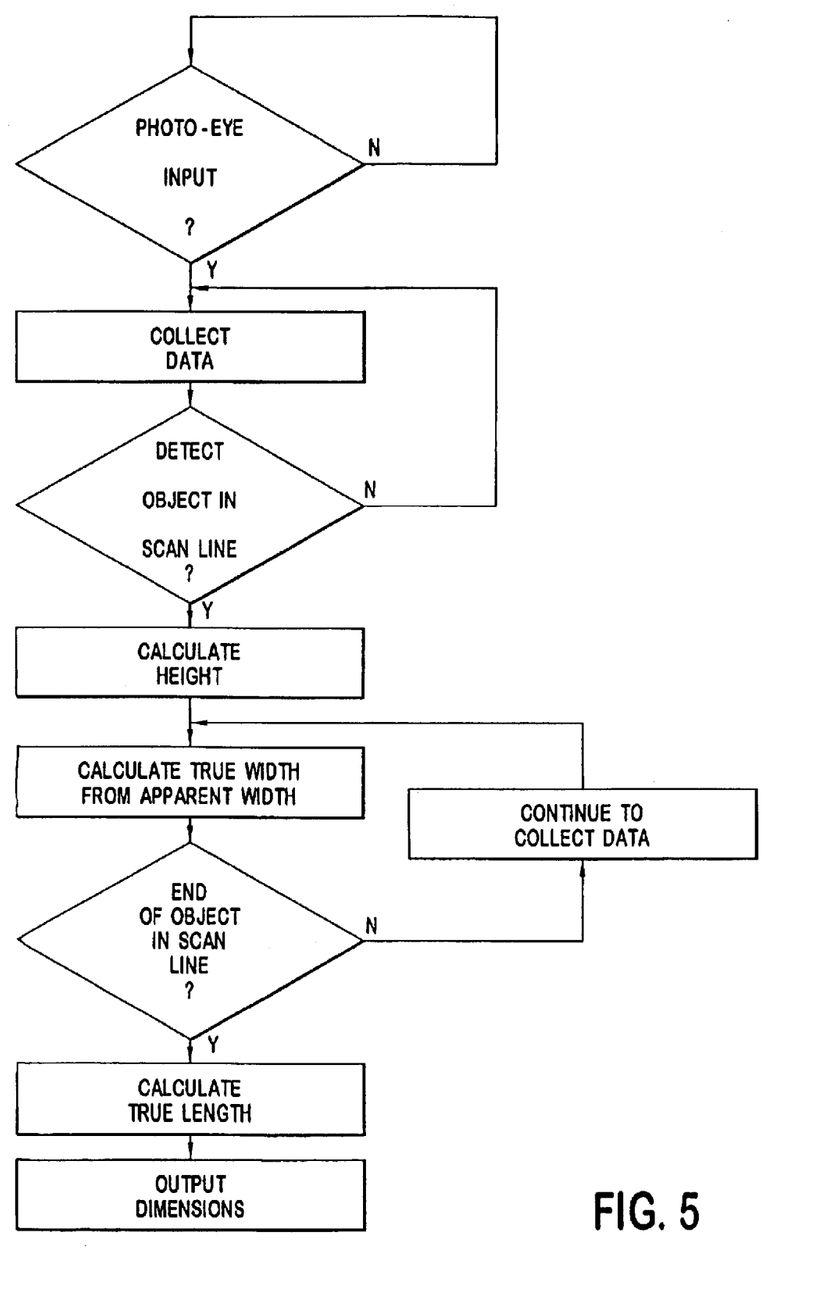
FIG. 5 is a process flow chart for taking measurements with the apparatus in accordance with the present invention.

With these known quantities and the leading edge signal, the object speed signal and the height determination signal, the height of the box can be calculated in the processor 40. Still with reference to FIGS. 2–4, the height h of the object at the object 12 leading edge is calculated in the processor by the formula:

$$h = [x - v(t_H - t_{LE})] \tan \alpha$$

where x=a fixed distance between the first sensor and the point of incidence of the sharp edge of light on the support surface 16, v=a speed of the object 12 on the support surface 16 determined by the speed signal, $t_B$=the height timing signal, $t_{LE}$=the leading edge timing signal, and α=the angle of incidence of the at least one sharp edge of light from the light source 26.

A trailing edge signal can also be provided by the first sensor which is the object detector 20 and a trailing edge signal can be generated. This signal can be transmitted to the processor 40 and used to calculate a length of the object 12 for objects 12 having leading and trailing sides which extend generally parallel to the sharp edge of the light beam 28. In this case, the length would be:

$$Y = v(t_{TE} - t_{LE})$$

where Y=the calculated length, $t_{LE}$=the leading edge timing signal, and $t_{TE}$=the trailing edge timing signal.

The true width of the object 12 can also be approximated in the processor 40 for objects 12 having generally parallel sides oriented parallel to the conveyor path 14. This is calculated using the formula:

$$W_t = W_a - (Lh/d + Rh/d)$$

where: $W_t$=the approximated true width, $W_a$=the apparent width calculated from the areas not obstructed by the object 12 from the negative image profile signal, L=a horizontal distance from a center line of the image sensor 32 to a leftmost object 12 obstruction point on the support surface 16 having a positive value when the leftmost object 12 obstruction point is left of the center line and being zero when the leftmost object 12 obstruction point is right of the center line calculated from the negative image profile signal, R=a horizontal distance from the center line of the image sensor 32 to a rightmost object 12 obstruction point on the support surface 16 having a positive value when the rightmost object 12 obstruction point is right of the center line and being zero when the rightmost object 12 obstruction point is left of the center line calculated from the negative image profile signal, and d=a distance from the light source to the support surface 16.

It is preferred that the true width be calculated for each scan. In the illustrated example shown in FIG. 2, shadows $S_L$ and $S_R$ are shown on each side of the object 12. However, if an edge of the object 12 does not cross the center of the belt C (which is preferably aligned with the line of sight 34 of the image sensor 32), then there is no shadow on that side and the input distance for that side of the object 12 is set to zero. With the above formula, the approximated height is only an approximation and is fairly accurate for angles of α greater than 75°.

Since the calculated height h of the object 12 is based only upon the detection of an initial blockage of the sharp edge of the light beam 28 by the object 12 in order to generate the height timing signal, for objects having a non-uniform height, the calculated height h may not accurately reflect the actual height of the article h. For each scan, the image sensor 32 cannot see the scan line on the support surface 16 between points B and E, and thus code is active during this time. From points A–B and points E–I, where the belt is visible and observed by the image sensor 32, the code is inactive. Since the distance from A–I is a known fixed quantity, the distance E–I never needs to be measured. Using the notation A_B to imply a distance in inches between the designated points, the equation shown above to calculate width can be derived as follows: the shadow equation for the right shadow is $S_R = h*\tan(\tan^{-1}(C\_E/d))$. The left shadow can be calculated using the equation: $S_L = h*\tan(\tan^{-1}(C\_B/d))$. These equations can be simplified as follows: for the right shadow, $S_R$, if E_C>0, then $S_R = (h*(E\_C))/d$. For the left shadow: $S_L$, if F<C), then $S_1 = (H*(C\_B))/d$. This then results in a true width $W_t$ or (F_G) of $W_a - (S_L + S_R)$.

It is also necessary to be able to calculate the width and length of the object 12 when the object 12 is oriented at an angle relative to the conveyor path 14. This can be done by observing the object 12 and generating a plurality of negative image profile signals at timed increments by the image sensor 32 as the object 12 passes by the light beam intersect path 30 on the support surface 16. Preferably, this is done for each scan line position observed by the photodiode array 32 in the preferred embodiment. The negative image profile signals are received by the processor 40 at the timed increments. A corrected transverse crossed sectional width of the object 12 is calculated by the processor 40 for each of the negative image profile signals. A first code location is determined by time increment, start position and scan length (A_F) for a first scan in which the light beam intersect path 30 is obstructed by the object 12. A left corner coordinate for a left most part of the object 12 is then determined along with the time of occurrence by finding the smallest A_F value for an object 12. The time of occurrence is preferably stored as a scan number after the first code point. A right corner coordinate is also determined for a right most part of the object 12 based on the greatest value of A_G (or smallest value of G_I) for the object 12 and the time of occurrence is also stored, preferably based upon the scan number from the first code location. Approximate rectilinear length and width dimensions can be calculated for the object 12 based upon the first code location, the left corner coordinate (A_F) and the right corner coordinate (A_G). It is also important to note that since the first code will include a beginning and an end, that the correct side of the first code is used in the calculations in order to avoid gross errors in calculation size. If the scan number for the smallest A_F is less than the scan number for the smallest G_I, the end of the first code is utilized. If the scan number for the smallest A_F is less than the scan number for smallest G_I, then the start of the first code is used.

It is also possible to define a complete two-dimensional negative image profile of the object 12 and/or the location of the object 12 on the support surface 16. To define a complete two dimensional image profile, the distances A_F and G_I at each scan position along the object 12 are stored and can be utilized to define the object perimeter. The position of the object 12 on the support surface 16 can be directly interpreted from the object profile based on the distances A_F and G_I. This information can be provided to downstream scanning systems to provide focus and orientation information for side read cameras.

It will be appreciated by those skilled in the art that changes could be made to the preferred embodiment of the invention described above without departing from the broad inventive concept thereof. For example, different systems for determining the object 12 length or speed can be used, if desired. It is understood, therefore, that the invention is not limited to the particular embodiment disclosed, and is intended to cover modifications within the spirit and scope of the present invention as defined by the appended claims.

What is claimed is:

1. Apparatus for determining measurements of an object moving along a conveyor path having a support surface, comprising:

an object detector located along the conveyor path adapted to detect a leading edge of the object and generate a leading edge signal;

an object speed detector located along the conveyor path adapted to generate an object speed signal;

a light source located above the conveyor path adapted to generate a light beam having a sharp edge which extends across the support surface in a direction transverse to a direction of movement of the object to define a light beam intersect path on the support surface, the light beam being at a fixed angle of incidence of less than 90° relative to the support surface;

an image sensor located above the support surface having a line of sight generally normal to the support surface and a lens located at a fixed position between the image sensor and the support surface to focus a reflected image of the light beam intersect path on the support surface onto the image sensor, such that the image sensor detects the light beam intersect path on the support surface only in areas not obstructed by the object and generates a negative image profile signal; and a signal processor in communication with the object detector, the object speed sensor and the image sensor which receives the leading edge signal, the object speed signal and the negative image profile signal and calculates an approximate object size.

2. The apparatus of claim 1 wherein the image sensor is a linear sensor array.

3. The apparatus of claim 1 wherein the light source is a static laser and the light beam is a visible line of light from the laser.

4. The apparatus of claim 1 wherein the object detector is a photoeye located along the conveyor path.

5. The apparatus of claim 1 wherein the object detector is adapted to detect a trailing edge of the object and generate a trailing edge signal.

6. Method of determining measurements of an object moving along a conveyor path having a support surface, comprising:

(a) projecting a light beam having a sharp edge from a light source aimed at a fixed angle of incidence transversely across the support surface to define a light beam intersect path;

(b) moving the object along the support surface;

(c) sensing a leading edge of the object at a fixed point along the conveyor path with a first sensor and generating a leading edge signal;

(d) detecting the speed of the object with an object speed detector and generating an object speed signal;

(e) detecting an initial blockage of the light beam intersect path on the support surface by the object and generating a height timing signal;

(f) observing a reflected image of the light beam intersect path projected on the support surface in areas not obstructed by the object as the object moves along the support surface with an image sensor having a line of sight generally normal to the object support surface and generating a negative image profile signal;

(g) transmitting the leading edge signal, the object speed signal, the height determination signal, and the negative image profile signal to a processor; and (h) calculating the object dimensions in the processor using the signals received from step (g).

7. The method of claim 6 further comprising:

(i) sensing a trailing edge of the object with the first sensor and generating a trailing edge signal; and (j) transmitting the trailing edge signal to the processor.

8. The method of claim 7 wherein a length of the object is calculated in the processor for objects having leading and trailing sides which extend generally parallel to the sharp edge of the light beam by the formula:

$$Y=v(t_{TE}-t_{LE})$$

where

Y=the calculated length, $t_{LE}$=the leading edge timing signal, and $t_{TE}$=the trailing edge timing signal.

* * * * *

UNITED STATES PATENT AND TRADEMARK OFFICE
CERTIFICATE OF CORRECTION

PATENT NO.   : 6,775,011 B2
DATED        : August 10, 2004
INVENTOR(S)  : Jeff Gagliano It is certified that error appears in the above-identified patent and that said Letters Patent is hereby corrected as shown below:

Column 5,
Line 40, delete "$h=[x-v(t_H-t_{LE})]\tan \alpha$" and insert therefor -- $h=[x-v(t_B-t_{LE})]\tan \alpha$ --.

Signed and Sealed this

Thirteenth Day of December, 2005

JON W. DUDAS
*Director of the United States Patent and Trademark Office*